Jan. 11, 1949. T. A. CALIENDO 2,458,681
REAMER TOOL FOR PIPES AND THE LIKE
Filed Dec. 7, 1945 3 Sheets-Sheet 3
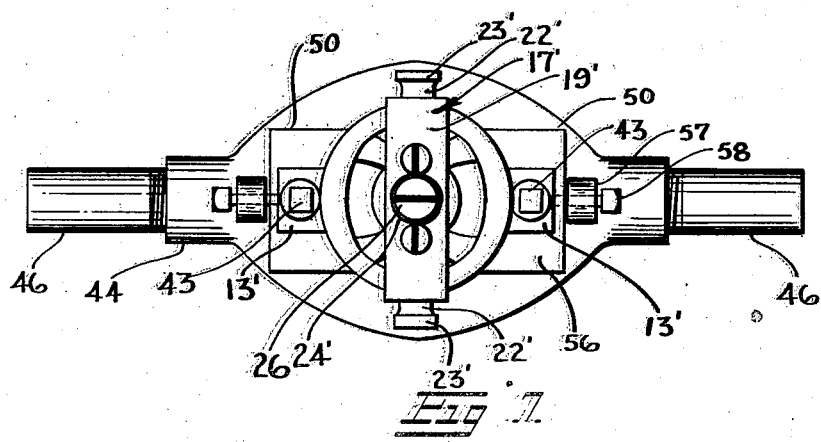
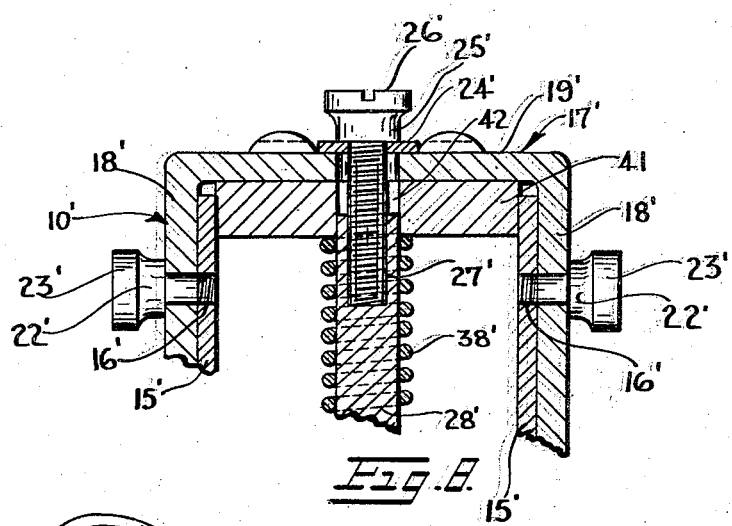
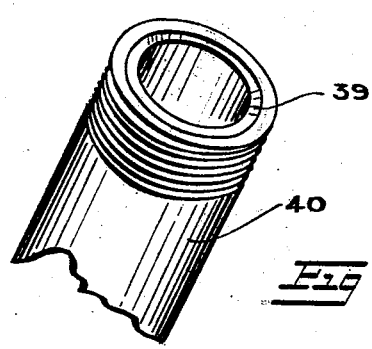
INVENTOR
THOMAS A. CALIENDO
BY
ATTORNEY Patented Jan. 11, 1949

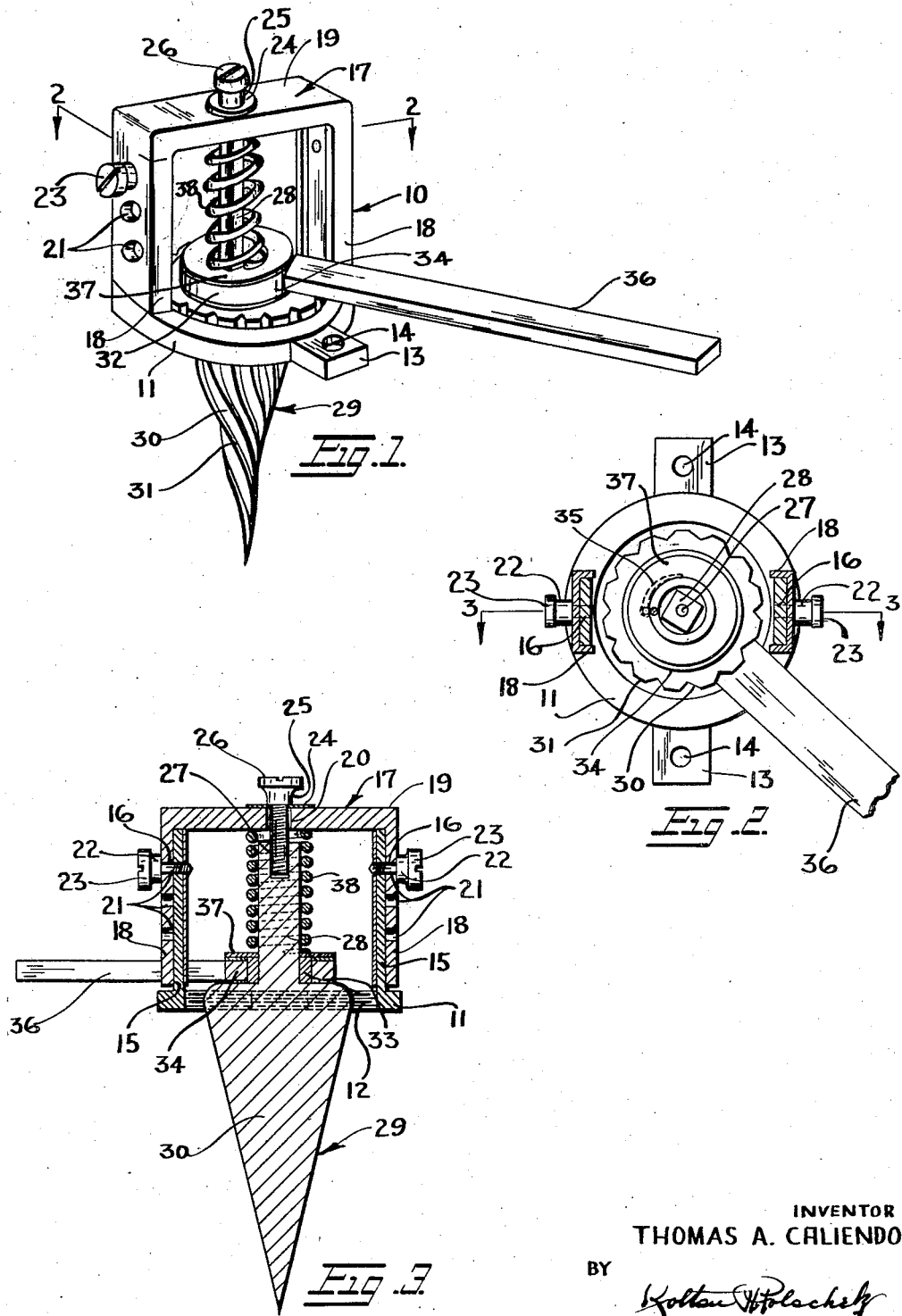

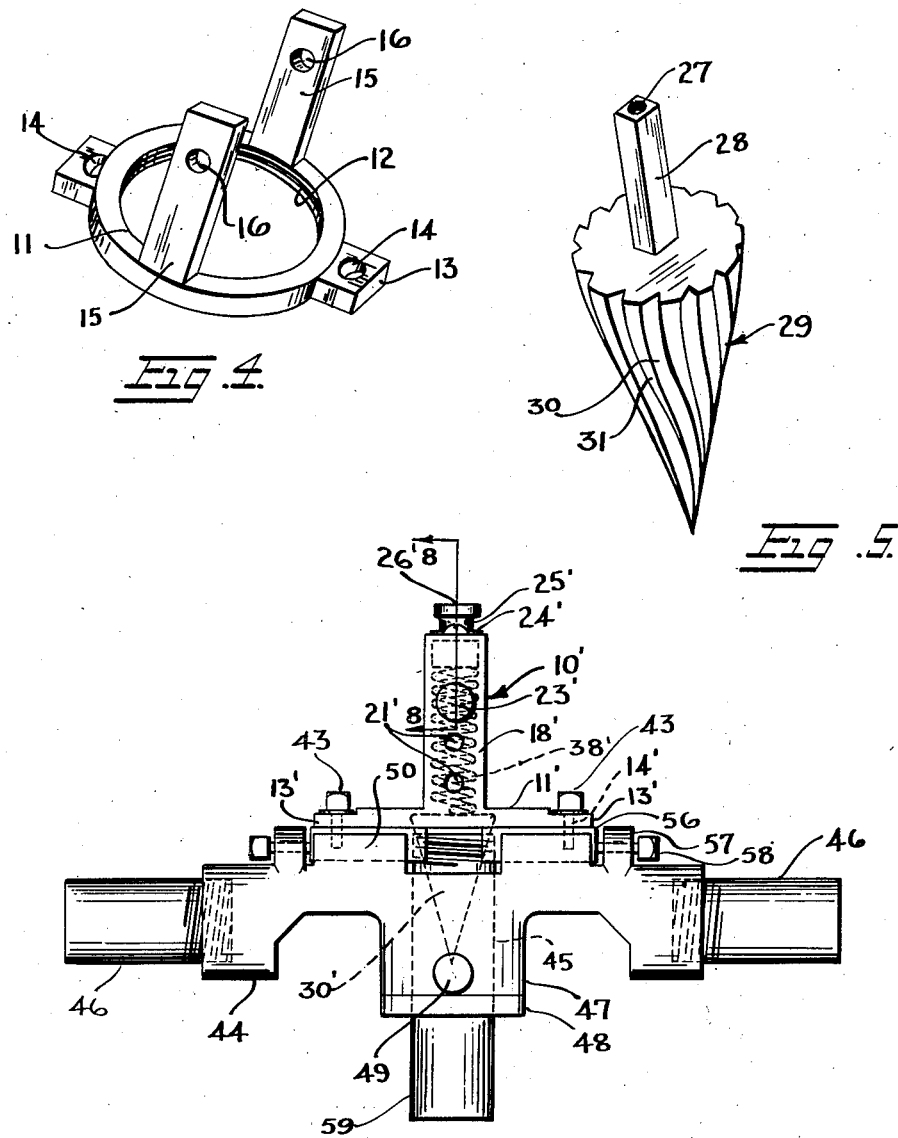

2,458,681

UNITED STATES PATENT OFFICE 2,458,681

REAMER TOOL FOR PIPES AND THE LIKE

Thomas A. Caliendo, South Ozone Park, N. Y.

Application December 7, 1945, Serial No. 633,452

4 Claims. (Cl. 77—73)

This invention relates to new and useful improvements in tools.

More specifically, the present invention proposes the construction of a tool adapted to ream the inside burr from the end of a pipe that has been cut, either with the threading of the cut end or separately therefrom.

A further object is to provide a tool as aforesaid including a pipe-threading stock and a pipe reaming attachment for the stock including an adjustable support for a reamer and means for holding the reamer against rotation relative to the support.

Still another object is to provide a pipe reaming tool including a vertically adjustable support, a pipe reamer secured to the support against rotation relative thereto, means for securing the support to a pipe threading stock, and other means for securing the support to the end of a pipe to be reamed.

A further object is to provide a pipe reaming tool including a vertically adjustable support, a pipe reamer secured to the support for rotation relative thereto, means for securing the support to a pipe threading stock, other means for securing the support to the end of a pipe to be reamed, and a ratchet handle for turning the reamer.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a pipe reaming tool constructed in accordance with this invention.

Fig. 2 is a section on the line 2—2 of Fig. 1.

Fig. 3 is a section on the line 3—3 of Fig. 2.

Fig. 4 is a perspective view of a part of the tool.

Fig. 5 is a perspective view of a reamer forming part of the tool.

Fig. 6 is a side elevation of a pipe threading and reaming tool constructed in accordance with a modification of this invention.

Fig. 7 is a plan view of Fig. 6.

Fig. 8 is a section on the line 8—8 of Fig. 6.

Fig. 9 is a perspective view of a pipe which has been threaded and reamed.

Referring first to Figs. 1–5, wherein a pipe reaming tool is shown embodying the present invention, this tool includes a vertically adjustable support 10. This support includes a ring 11 having internal threads 12, lateral lugs 13 having orifices 14 and upstanding guides 15 each having a threaded orifice 16 at its upper end. The guides are rectangular in cross section. The lugs are for use in bolting the support to a pipe threading stock, if desired, and the threads 12 are for screwing the ring, and thus the support, on the threaded end of a pipe to be reamed, if desired.

The support further includes a yoke 17 having depending legs 18, channel shaped in cross section, and slidably telescoped on the guides 15. The legs are connected at their tops by a bar 19 formed integrally with the legs. Bar 19 has a central unthreaded bore 20 and the legs 18 are each formed with a row of unthreaded orifices 21.

A shouldered bolt 22 has its shoulder resting against the outer face of its correlated leg and its threaded stem extended through any one of the orifices 21 and threaded into the aligned orifice 16 of the respective guide 15. Thus the vertical distance between the bar 19 and the ring 11 may be adjusted to as many positions as there are orifices 21. Three orifices 21 are shown in the present instance. Each bolt 22 has a slotted head 23. There is a bolt 22 for each leg 18.

A washer 24 is disposed on top of bar 19 over bore 20 and a shouldered bolt 25, having a slotted head 26, is disposed in this bore 20 and is threaded into a threaded recess 27 in the stem 28 of a reamer 29, the reamer having the usual conical head 30 provided with helical cutting blades 31. The reamer is disposed vertically in the support between the guides 15 and the recess 27 is vertical.

A ratchet device 32 is secured on the stem 28 for turning the reamer. The stem 28 is square in cross section, and the ratchet device includes a toothed member 33 disposed on the square stem and resting on top of the reamer head 30, a ring 34 carrying a ratchet pawl 35 for rotation relative to the member 33 and adapted to coact therewith to turn the reamer, and a handle 36 integral with the ring 34 and extending outwardly between the guides 15. Thus the handle can be rotated between the guides 15, or slightly less than 180 degrees. The ratchet device operates according to well known principles and no further description thereof is deemed necessary.

A washer 37 is supported on top of the ring 34 and a coil spring 38 is compressed between the washer 37 and the bar 19 by the screw or bolt 25. The coil spring holds the ratchet device against the reamer head and forces the reamer downwardly against the end of the pipe to be reamed.

The operation of the tool is as follows:

Assuming that the tool is not to be used with any other tool, but is to be used directly as a pipe reamer, the pipe is threaded into the thread 12 of the ring 11, or if the thread 12 is too large, a reducer is employed. Thus it will be seen that the tool, when used alone, must be used with a threaded pipe although it may be adapted to be used with an unthreaded pipe if some other securing means for the unthreaded pipe, to which the lugs 13 may be bolted, is provided.

The reamer has a long slender taper, adapting it to fit a long range of pipe sizes. It may be adjusted vertically relative to the ring 11 by removing the bolts 22 from their position in Fig. 3 (lowest position) and by sliding the yoke upwardly in the guides and placing the bolts 22 back in other orifices 21.

The reamer having been set in its correct position, and the pipe initially threaded into the ring 11, the pipe is then turned relative to the ring, or vice versa, until the burr of the cut end of the pipe engages the reamer. The handle 36 is then moved back and forth in the manner usual with ratchet handles, turning the reamer to remove the burr. As the burr is reamed away, the spring forces the reamer along to keep removing the burr. The tension of the spring can be regulated by the extent that the pipe is turned into the threads 12. That is to say, looking at Fig. 3, it will be noticed that there is clearance above the stem of the reamer, and the pipe to be reamed can be turned into the threads 12 sufficiently to force the reamer to the bar 19, thus compressing the spring. As the burr is reamed, the reamer will return to the position shown in Fig. 3.

The principle of the reaming tool, as thus described, is adaptable to a threading and reaming tool, or in fact, the tool as thus far described, can be used with a conventional threading stock so that a pipe can be simultaneously threaded and reamed. However, as will presently appear, a part must be added to the reaming tool to adapt it for this use.

The combination pipe threading and reaming tool is shown in Figs. 6–8. It includes all the parts of the tool of Figs. 1–5 and thus similar parts are represented by like references with an accent added and no further description thereof is deemed necessary. The tool of Figs. 6–8 distinguishes from the tool of Figs. 1–5 as follows:

The pipe reaming tool 10' includes, in addition to the structure previously described, a bar 41 which is retained in the channels of the legs 18' and which has a square hole 42 in which the square stem 28' of the reamer is disposed, the channels preventing the bar 41 from turning and the bar 41 preventing the reamer from turning relative to the support. The spring 38' bears against the under surface of the bar 41.

The lugs 13' are bolted, by bolts 43 to a pipe threading stock 44, with the ring 11' concentric with the center bore 45 of the stock. The stock has opposite handles 46 by means of which the stock can be turned. The bore 45 is in a boss 47, in the bottom of which is fitted a ring 48 secured to the boss by a set screw 49. The ring 48 is of an inside diameter suitable to receive a certain pipe, and it may be replaced by other rings to fit other size pipes.

Guides 50 are formed on two opposite sides of the bore 45 and thread-making dies 56 are slidably disposed in the guides. Lugs 57 extend upwardly at the ends of the dies 56 and these lugs have threaded orifices for set screws 58 which form an adjustable abutment for the dies.

A pipe 59, to be threaded and reamed, is passed upwardly through the bore 45, being guided by the ring 48, until it is in correct position to be threaded by the dies. The reamer is also set so that toward the end of the threading, the reamer will come into operative engagement with the burr to be reamed. The dies are moved into their correct position by the screws 58.

To carry out the simultaneous threading and reaming, the pipe is secured in a vise or other means, and the two handles 46 are manually grasped and the tool rotated. First the threading takes place until the reamer engages the burr of the pipe, and then the threading continues simultaneously with the reaming of the burr. When the threading has been finished, the reaming will also be finished, the reamer having been set so that this will be true.

From the foregoing, it will be seen that a reaming tool has been devised for manually reaming a threaded pipe. Furthermore, this same tool can have added thereto a part to hold the reamer stationary relative to the rest of the tool, and a pipe theading stock. The tool thus devised is adapted to simultaneously thread and ream a pipe.

In both tools, the spring permits the reamer to move up and down, if necessary, to prevent jamming as the reamer cuts into the burr.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. A manual pipe reaming tool for reaming out the burr from the cut end of a pipe comprising a ring, opposed guides, rectangular in cross section, extending from opposite sides of one face of said ring, said guides having opposed threaded orifices, a yoke having channeled legs slidably mounted on said guides and a cross bar connecting said legs, said legs each having a row of unthreaded orifices, set screws adapted to be disposed in correlated orifices of said legs and to be threaded in said guide orifices to adjustably secure said yoke to said guides, said bar having an unthreaded orifice concentric with said ring, a shouldered bolt in said bar orifice, a reamer having a conical head and a square stem, said stem having a threaded axial recess into which said bolt is screwed, a coil spring compressed between said head and yoke for normally urging said reamer away from said bar, said stem normally being spaced from said bar, and means for causing relative movement between said pipe and reamer to effect said reaming.

2. A manual pipe reaming tool for reaming out the burr from the cut end of a pipe comprising a ring, opposed guides, rectangular in cross section, extending from opposite sides of one face of said ring, said guides having opposed threaded orifices, a yoke having channeled legs slidably mounted on said guides and a cross bar connecting said legs, said legs each having a row of unthreaded orifices, set screws adapted to be disposed in correlated orifices of said legs and to be threaded in said guide orifices to adjustably secure said yoke to said guides, said bar having an unthreaded orifice concentric with said ring, a shouldered bolt in said bar orifice, a reamer having a conical head and a square stem, said stem having a threaded axial recess into which said bolt is screwed, a coil spring compressed between said head and yoke for normally urging said reamer away from said bar, said stem normally being spaced from said bar, and means for causing relative movement between said pipe and reamer to effect said reaming, said means including a ratchet device disposed on said square stem and having a handle projecting between said guides.

3. A manual pipe reaming tool for reaming out the burr from the cut end of a pipe comprising a ring, opposed guides, rectangular in cross section, extending from opposite sides of one face of said ring, said guides having opposed threaded orifices, a yoke having channeled legs slidably mounted on said guides and a cross bar connecting said legs, said legs each having a row of unthreaded orifices, set screws adapted to be disposed in correlated orifices of said legs and to be threaded in said guide orifices to adjustably secure said yoke to said guides, said bar having an unthreaded orifice concentric with said ring, a shouldered bolt in said bar orifice, a reamer having a conical head and a square stem, said stem having a threaded axial recess into which said bolt is screwed, a coil spring compressed between said head and yoke for normally urging said reamer away from said bar, said stem normally being spaced from said bar, and means for causing relative movement between said pipe and reamer to effect said reaming, said means including a pipe threading stock secured to said ring.

4. A pipe reamer, comprising a ring for engagement on a pipe to be reamed, a bar extended across said ring at a point spaced from one side thereof and formed with a bore concentric with said ring, means adjustably connecting said bar to said ring for varying the spacing between the adjacent faces thereof, a reamer within said ring and formed with a stem extended toward said bar, said stem being formed at its free end with a threaded opening aligned with said bore, means on said reamer for turning the same, a headed bolt freely rotatively and longitudinally slidably extended through the bore of said bar and threadedly engaging the opening of said stem for rotatively and longitudinally slidably supporting said reamer on said bar, said bolt having its head disposed on the outer side of said bar, and a spring on said stem operating between the adjacent faces of said reamer and said bar for urging said reamer and bolt into a longitudinal position in which the head of said bolt will be in facial contact with the outer face of said bar.

THOMAS A. CALIENDO.

REFERENCES CITED

The following references are of record in the file of this patent:

UNITED STATES PATENTS

| Number | Name | Date |
|---|---|---|
| 1,328,208 | Schank | Jan. 13, 1920 |
| 1,762,670 | Siesko | June 10, 1930 |
| 1,774,152 | Olson | Aug. 26, 1930 |
| 1,791,649 | Vosper | Feb. 10, 1931 |
| 2,330,242 | Romero | Sept. 28, 1943 |